United States Patent [19]

Ogren

[11] Patent Number: 4,955,630
[45] Date of Patent: Sep. 11, 1990

[54] FIFTH WHEEL ACTIVATED TRAILER STEERING

[76] Inventor: Axel E. Ogren, 855 S. 12th Ave., LeGrange, Ill. 60525

[21] Appl. No.: 362,336

[22] Filed: Jun. 5, 1989

[51] Int. Cl.⁵ .............................................. B62D 13/00
[52] U.S. Cl. ...................................... 280/419; 280/100
[58] Field of Search .............. 280/442, 426, 419, 100; 180/235

[56] References Cited

U.S. PATENT DOCUMENTS

| | | |
|---|---|---|
| 1,619,941 | 3/1927 | Kennedy . |
| 2,907,576 | 10/1959 | Hutchens . |
| 2,959,428 | 1/1959 | Felburn ............................. 280/426 |
| 4,351,408 | 9/1982 | Moll . |
| 4,657,274 | 4/1987 | Mann et al. .......................... 280/433 |

FOREIGN PATENT DOCUMENTS 566724  4/1958  Belgium .............................. 280/426

*Primary Examiner*—Charles A. Marmor
*Assistant Examiner*—Alan M. Kager

[57] ABSTRACT

Steering mechanism for trailer wheels is provided with a slide having a tongue selectively engaged with and retracted from the fifth wheel of a tractor. When the tongue is engaged with the fifth wheel, any pivoting of the fifth wheel about the kingpin connection between the tractor and trailer, as when the tractor is steered from a straight ahead position relative to the trailer, causes the tongue to swing a link pivoted on the slide mechanism under the trailer. This swinging of the link drives a flexible cable to control a valve of a power steering system for the trailer rear wheels. The components are mounted under the floor of the trailer and a cable driven winch with a crank or power drive at the side of the trailer advances and retracts the slide to move the tongue into and out of engagement with the tractor fifth wheel. Magnets are mounted in the tongue and a torsion spring is provided in the winch mechanism to maintain tight contact between the tongue and fifth wheel. An adjustable lost motion linkage may control the power steering valve for preventing sudden swing-out of the extended end portion of the trailer. The mechanism greatly reduces the turning radius for the vehicle, prevents turnover in the event of sudden acceleration, swerving and sudden turns, and improves the tracking of the trailer.

20 Claims, 5 Drawing Sheets

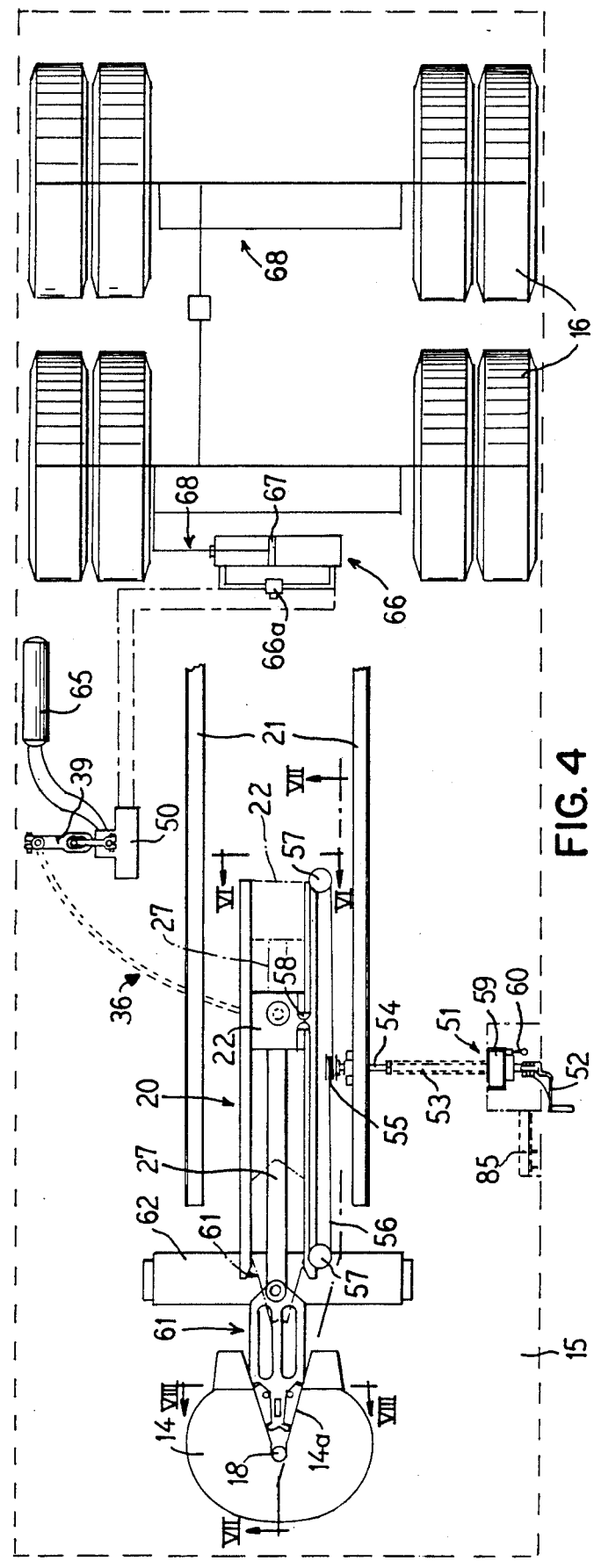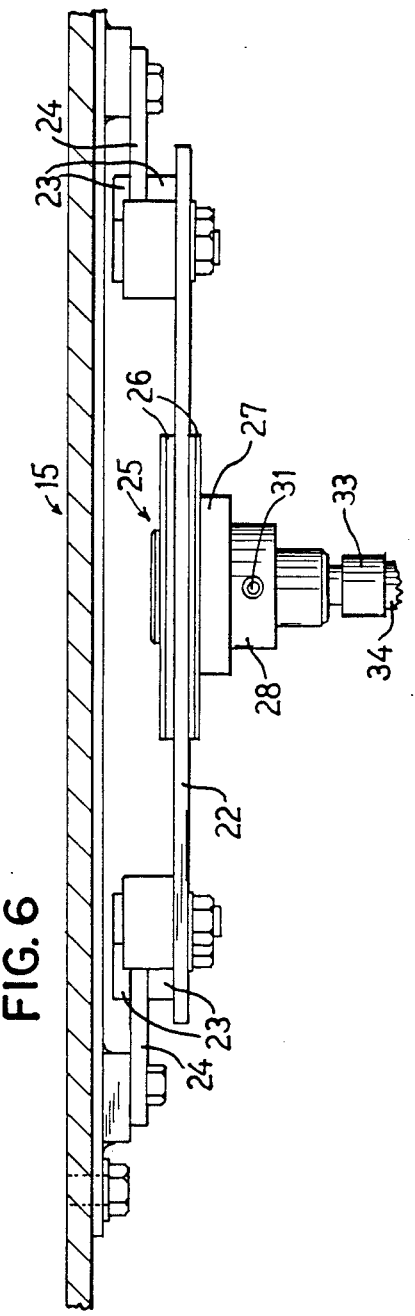
FIG. 4
FIG. 6

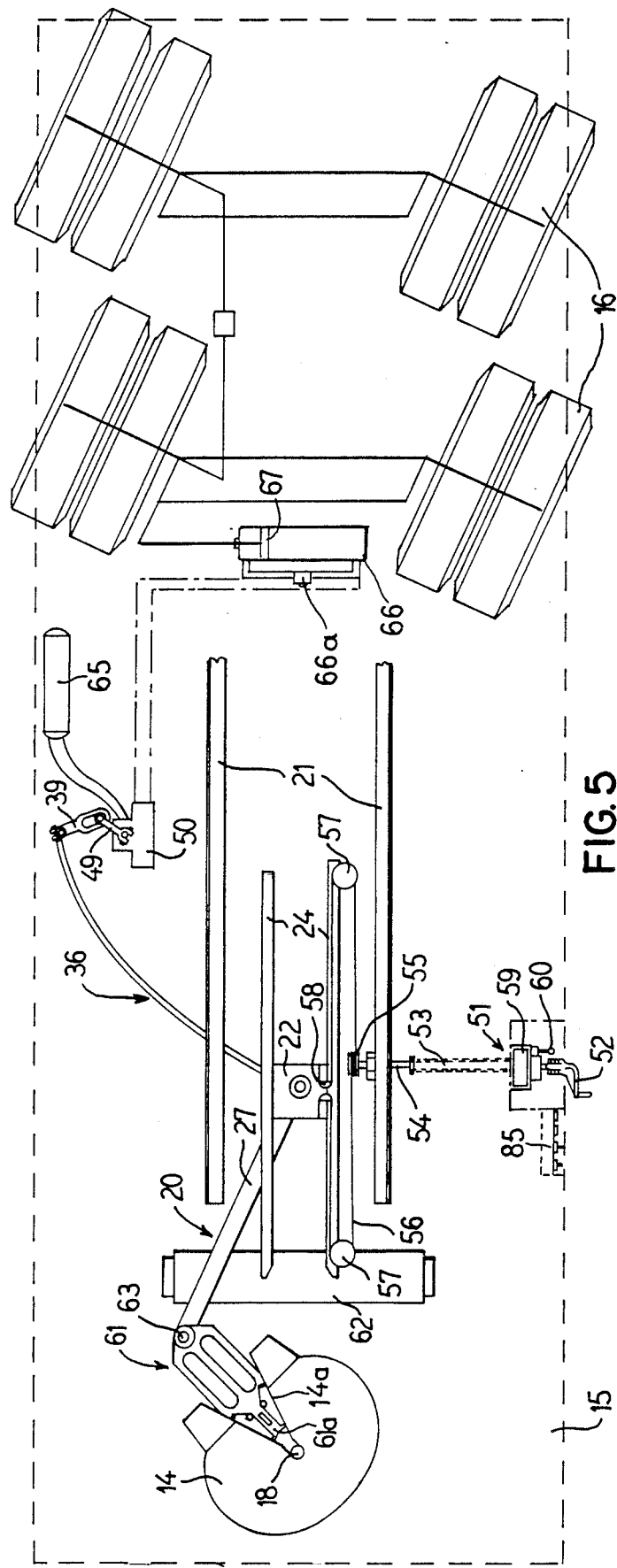
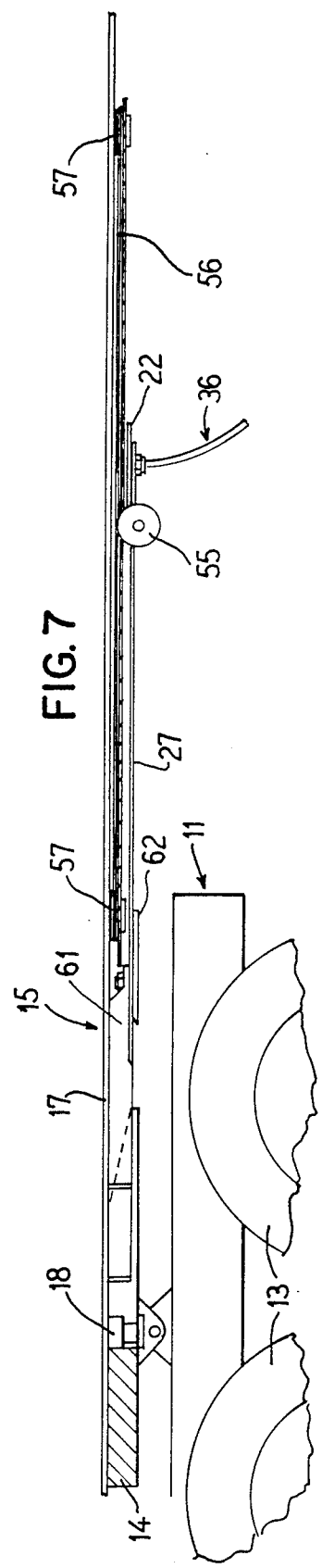
FIG. 5
FIG. 7

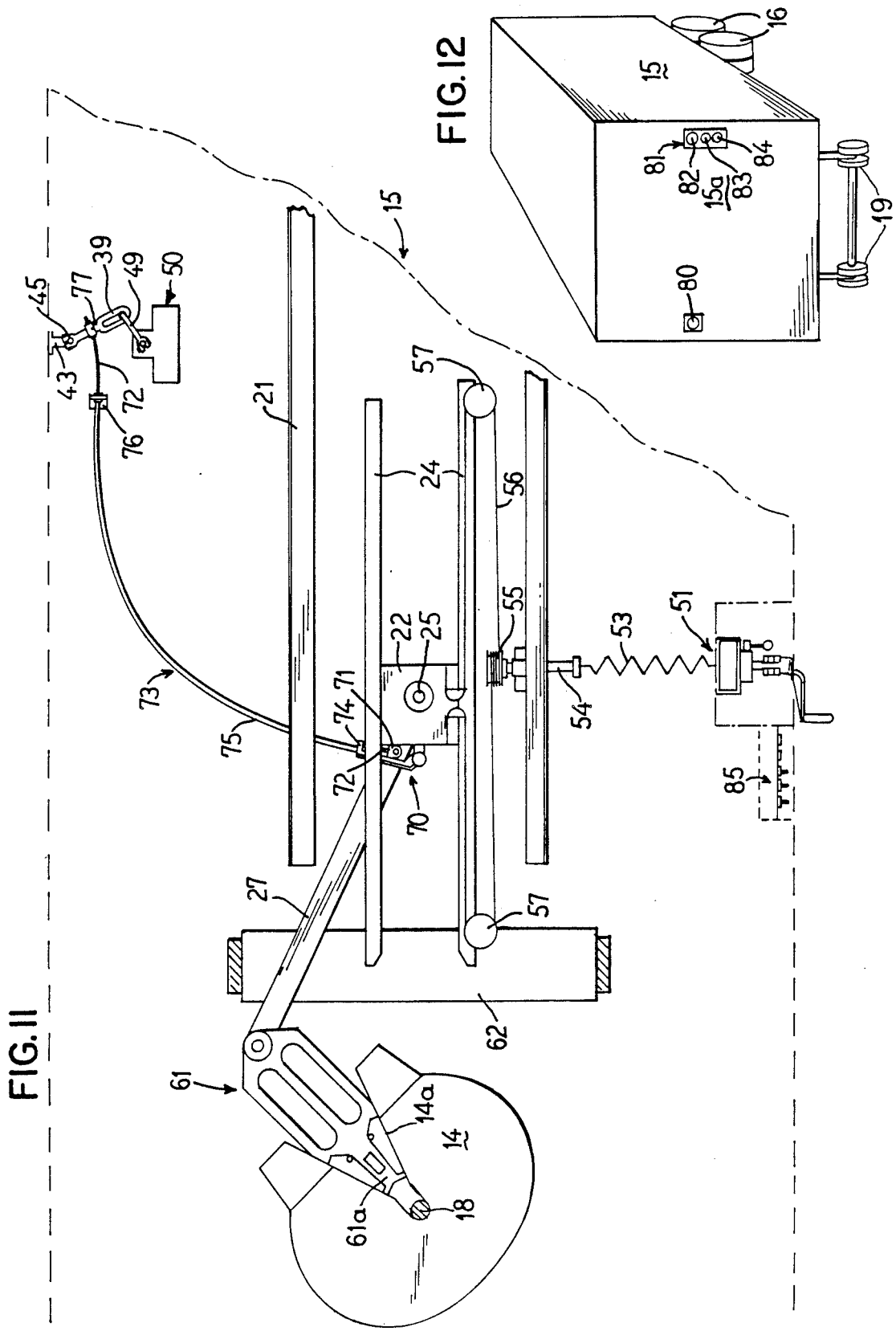

FIFTH WHEEL ACTIVATED TRAILER STEERING

BACKGROUND OF THE INVENTION

1. Field of the Invention

This invention relates to the art of steering trailer wheels under the control of the fifth wheel of a tractor in a conventional tractor semitrailer assembly and particularly deals with trailer mounted steering mechanisms coupled to and uncoupled from the standard fifth wheel of a tractor by a trailer mounted control.

2. Description of the Prior Art

Heretofore known systems for steering tractor wheels of tractor semitrailer vehicles have required special tractor mounted controls and mechanisms that were not easily uncoupled from the trailer so that it was not practical to provide trailer wheel power steering in tractor-trailer vehicles which were frequently uncoupled.

It would therefore be an improvement in this art to provide trailer mounted rear wheel power steering controlled by the standard tractor mounted fifth wheel coupled to the standard semitrailer kingpin.

It would be a further improvement in this art to provide a power steering system for the rear wheels of semi trailers which has a trailer mounted slide advancing and retracting a tongue into and out of coupling engagement with the fifth wheel of the tractor to control the system.

It would be a still further improvement in this art to provide a flexible control cable connection between a fifth wheel actuated trailer link and a control valve of a hydraulic trailer wheel power steering mechanism and it would be an additional improvement to provide a lost motion connection between the cable and valve to program the rear wheel steering for minimizing initial sudden swing-out of the extended end portion of the trailer.

Another feature of the invention is the provision of operation lights and alarms on the trailer to show when the power steering system is in an operating mode and to warn against abnormal steering conditions as in making extremely sharp turns for docking and when driving on rough roads.

SUMMARY OF THE INVENTION

According to this invention, semitrailers for tractors have power steered rear wheels controlled by a tongue releasably seated in the slot of a conventional tractor mounted fifth wheel receiving a conventional trailer mounted kingpin to couple the trailer to the tractor. The components of the system are mounted under the bottom of the trailer and a winch accessible from the side of the trailer advances and retracts the tongue. When the tongue is coupled to the fifth wheel, no other controls or couplings are needed for the steering of the trailer rear wheels from the tractor. The conventional electric power line from the tractor supplies any electric power needed by the system such as a power steering pump, lights and alarms.

Specifically, the rear wheels can be mounted on swingable kingpins controlled by a steering linkage, such as a hydraulically powered parallelogram assembly.

Longitudinal tracks suspended from the bottom of the trailer mount a slide which pivotally supports the rear end of a link. A tongue is pivoted to the forward end of the link and is slideably supported under the forward end of the trailer. A winch mechanism mounted along on side of the trailer advances and retracts the slide to push the tongue into the conventional "V" slot of the conventional tractor mounted fifth wheel and to pull the tongue back under the trailer. Thus, when the tractor is backed under the front end of the trailer, the fifth wheel will slide under the conventional trailer kingpin plate and the depending kingpin will be coupled to the fifth wheel. Then the winch mechanism on the trailer is driven to push the tongue into the fifth wheel slot and when the fifth wheel pivots around the kingpin, the tongue will swing the front end of the link laterally as the tractor is steered into an angled relationship with the trailer.

A flexible cable driven by the swinging link operates the power steering valve of the trailer wheel steering system.

To avoid sudden swing-out of the rear end portion of an extremely long trailer as the tractor is turned, a lost motion connection between the cable and valve is provided which can be programmed to regulate the amount of swing-out of the extended portion of a very long trailer overhang.

Thus, as the link swings in response to the turning of the tractor, the power steering control valve is operated to control flow of the power steering fluid to the steering system to turn the trailer wheels when the tractor is turned at an angle to the trailer thereby greatly shortening the required turning radius for the vehicle. When the tractor and trailer are in alignment the control valve locks the trailer wheels in the straight ahead position. The trailer wheels are also locked in the straight ahead position when the system is deactivated.

The invention will be more fully understood from the attached sheets of drawings showing a best mode embodiment of the invention and from the following descriptions of the drawings.

On the drawings:

FIG. 4 is a sectional plan view under the bottom of the trailer taken generally along the line IV—IV of FIG. 1 and also showing in dotted lines, the retracted position of the tongue;

FIG. 5 is a view similar to FIG. 4 but showing the coupled position of the trailer power steering system in a turning position;

FIG. 6 is a transverse sectional view along the line VI—VI of FIG. 4;

FIG. 7 is a fragmentary longitudinal sectional view along the line VII—VII of FIG. 4;

FIG. 11 is a fragmentary view similar to FIG. 5 but showing a modified cable control for the valve;

FIG. 12 is a front end perspective view of the trailer showing the operating lights and warning devices for the power steering system of the trailer;

DESCRIPTION OF THE PREFERRED EMBODIMENTS

Figure 1:
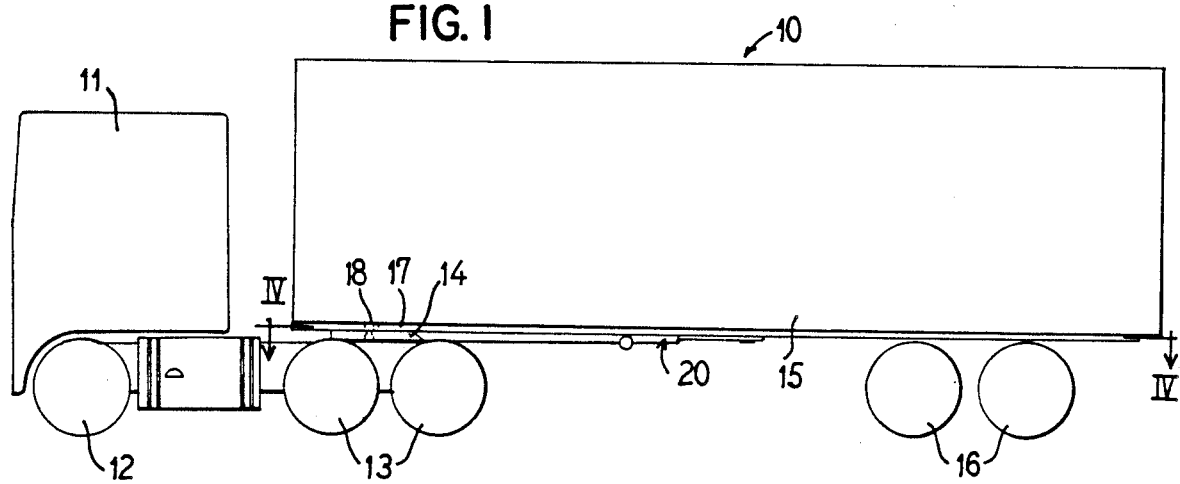
FIG. 1 is a somewhat diagrammatic side elevational view of a tractor-semi trailer vehicle equipped with the fifth wheel activated trailer steering system of this invention.

In FIG. 1, the vehicle 10 includes a tractor 11 with front steering wheels 12 and rear driving wheels 13. The tractor 11 has a conventional horizontal fifth wheel 14 on the frame portion thereof above the rear wheels 13.

A semi trailer 15 is supported near its rear end on two sets of steerable wheels 16 and at its front end by the fifth wheel 14 of the tractor. The bottom of the trailer mounts the conventional plate 17 carrying the conventional depending kingpin 18 for coupling to the fifth wheel. As shown in FIG. 12, the front end of the trailer when uncoupled from the tractor is supported on conventional retractable dolly wheels 19.

As indicated in FIG. 1, the power steering system 20 for the trailer 15 is mounted under the bottom of the trailer frame.

Figure 2:
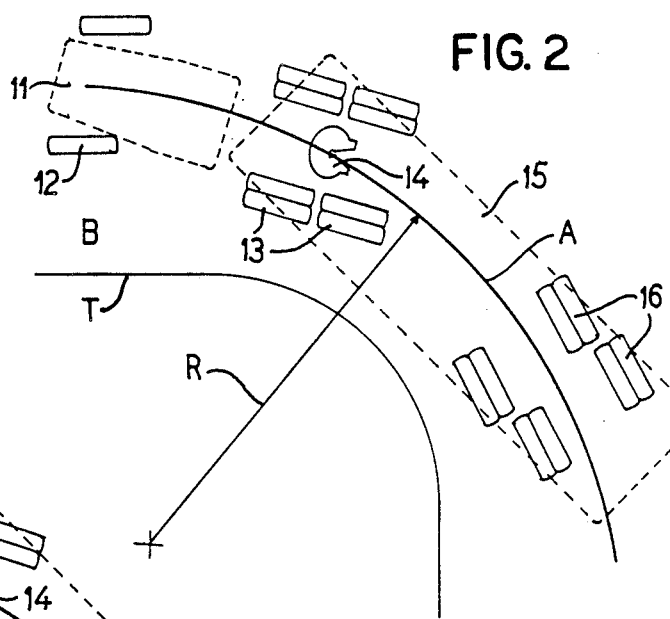
FIG. 2 is a top phantom view illustrating the turning radius of a tractor relatively-short semi trailer vehicle, equipped with the power steering system of this invention.

As illustrated in FIG. 2, as the fifth wheel 14 of the tractor 11 turns with the tractor in the direction of the front steering wheels 12, the power steering system 20 of this invention will turn the rear wheels 16 of the trailer 15 causing the trailer to turn about an arc "A." having a much shorter radius "R" than is possible with a trailer that does not have steerable rear wheels. In a trailer 15 having a body length of 20-35 feet as shown in FIG. 2, this radius "R" will be about 30 feet.

Figure 3:
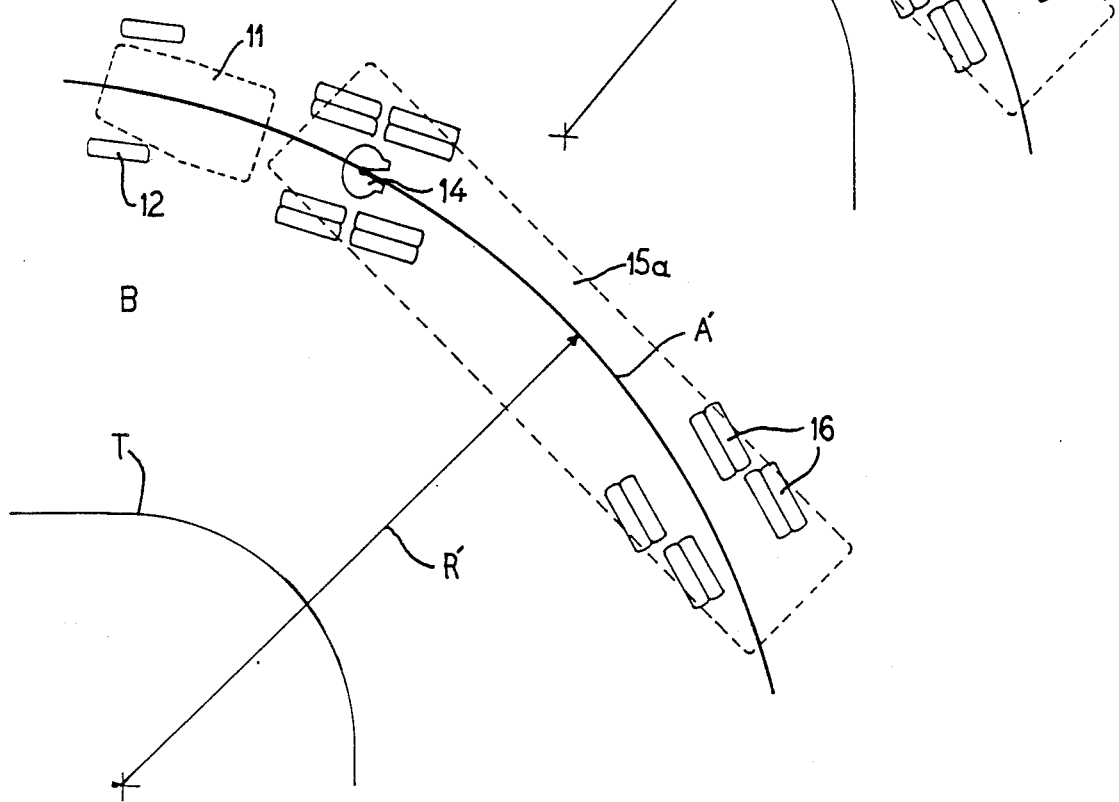
FIG. 3 is a view similar to FIG. 2 but showing turning radius of a tractor relatively-long semi trailer vehicle equipped with the steering system of this invention.

In an extra long trailer 15a of about 35-50 feet as shown in FIG. 3, the arc "A." will have a greater radius "R'" of about 40 feet. As illustrated in FIGS. 2 and 3, the trailers of both vehicles can easily be manipulated around relatively sharp turns "T" of a road bed "B".

Figure 10:
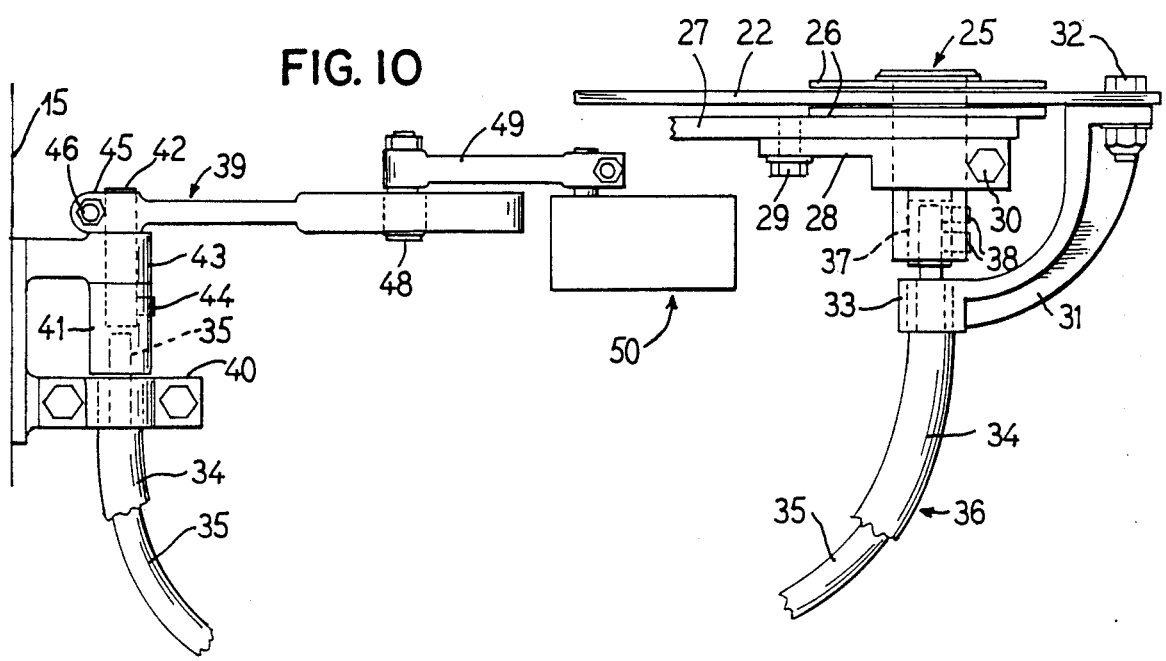
FIG. 10 is a side elevational view of the cable drive to the linkage of FIG. 9.

As illustrated in FIGS. 4 and 5, the power steering system 20 is mounted under the bottom of the trailer 15 preferably between the longitudinal parallel frame beams 21 of the trailer. A slide plate 22 is mounted for longitudinal movement under the trailer 15 near the front end thereof. As shown in FIG. 6, this plate 22 has slide blocks 23 preferably composed of "Teflon" type plastic material straddling track plates 24 mounted under the tractor between its frame beams 21. As shown in FIGS. 6 and 10, this slide plate 22 rotatably mounts a vertical pin 25. Washers 26 on the pin ride on the top and bottom faces of the slide plate 22. An elongated link arm 27 receives the pin 25 therethrough under the bottom washer 26 and the rear end of this link is bolted to a clamp 28 by bolts 29. The clamp 28 is tightened to the shank of the pin by a bolt 30 so that the swinging of the elongated link arm 27 will rotate the pin.

A bracket 31 bolted to the plate 22 at 32 depends from the bottom of the plate along side the pin 25 and has a hub 33 to which is affixed the flexible tubular housing 34 of a flexible cable 35 of a conventional flexible shaft drive assembly 36. The drive shaft cable 35 projects through the hub 33 into a tapped hole or recess 37 in the bottom of the pin. Set screws 38 threaded through the pin bite into the cable 35 to lock it for rotation with the pin.

The opposite end of the flexible drive shaft 36 is coupled to rotate a lost motion arm 39 and for this purpose, as illustrated in FIG. 10, the opposite end of the cable 34 is clamped in a bracket 40 secured under the trailer 15 and the opposite end of the flexible drive cable 35 is affixed to a rotatable bushing 41 carried by the clamp. A pin 42 rotatably supported in a bushing 43 of the bracket carrying the clamp 40 is pinned to this bushing or bearing sleeve 41 by set screws 44 or the like.

The lost motion link arm 39 has a split bushing 45 on the end thereof clamped to the pin 42 as by means of a draw bolt assembly 46 so that when the cable 35 is rotated, the arm 39 will swing.

Figure 9:
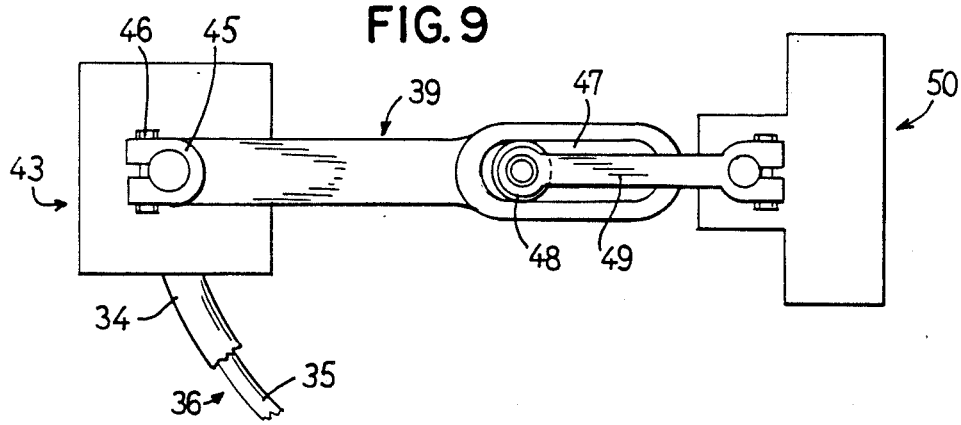
FIG. 9 is a fragmentary plan view of a lost motion linkage drive for the power steering valve.

The free end of the arm has an elongated eye 47, as shown in FIG. 9 in which is slidably supported a roller 48 on an end of a rod 49 operating the hydraulic steering valve 50.

The arrangement is such that when the link arm 27 swings laterally, it will actuate the flexible shaft drive connection between the link arm 27 and the arm 39 controlling the valve 50. The flexible shaft drive 36 accommodates sliding of the plate 22.

The plate 22 is advanced and retracted along the length of the tracks 24 by a winch mechanism 51 which is mounted along one side of the tractor 15 preferably just under this side as shown in FIGS. 4, 5 and 7. As therein shown, a crank 52 drives a torsion spring 53 coupled to a shaft 54 rotatably mounted, for example, in a frame beam 21 of the trailer. The shaft 54 drives a drum or winch 55 having a number of turns of a cable 56 wound therearound. The cable 56 is trained around end pulleys which are horizontally oriented and rotatably mounted for example from the ends of one of the tracks 24. The inner run of the cable overlies the plate 22 and is anchored to this plate at 58. When the crank 52 is rotated, the torsion spring 53 is tightened to rotate the shaft 54 and cause the winch 55 to drive the cable 56 thereby sliding the plate 22 along its tracks 24. Alternately, as shown in FIGS. 4 and 5, an electric motor 59 controlled by a switch 60 can be provided to rotate the winch 55 in place of the manually operated crank 52.

The link arm 27 which is connected at its rear end for co-rotation with the pin 25 on the plate 22, extends forwardly from the plate and is pivoted at its forward end to the rear end of a tongue member 61. This tongue member is slidably supported on a transverse slide plate 62 depending from the bottom of the trailer near the forward end thereof. The pivot pin connection 63 between the forward end of the link arm 27 and the rear end of the tongue 61 accommodates free lateral swinging of the tongue relative to the arm as illustrated in FIG. 5.

The tongue 61 is shaped to enter the conventional rear opening V slot 14a of the fifth wheel 14 and as shown at 61a the front end of this tongue has a nose converging toward the kingpin receiving end of the slot 14a.

Figure 8:
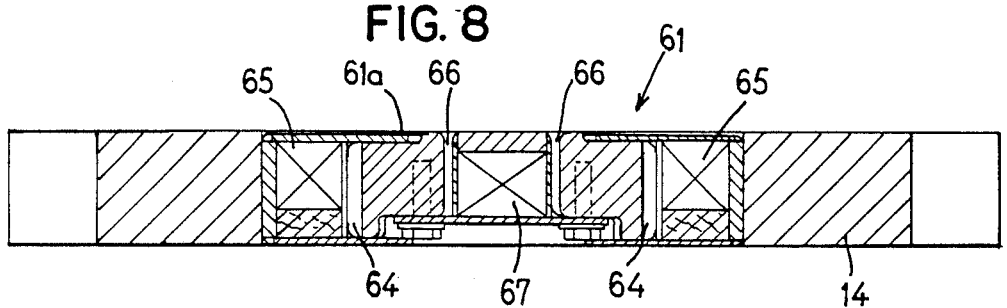
FIG. 8 is a transverse section of the tongue along the line VIII—VIII of FIG. 4.

As shown in FIG. 8, the converging front end nose portion 61a of the tongue 61 has side recesses 64 receiving permanent magnets 65. The longitudinal central portion of this front end 61a of the tongue 61 also has central pocket 66 to receive an additional longitudinally extending magnet 67.

When tractor 11 is coupled to the trailer 15 with the kingpin 18 of the trailer locked in the converging end of the fifth wheel slot 14a, the winch 55 is driven to slide the plate 22 forwardly, pushing the link 27 and the tongue 61 thereon into the fifth wheel slot 14a where the nose 61a of the tongue is firmly bottomed in the converging side walls of the slot 14a and the magnets become effective to provide a tight connection between the tongue and the fifth wheel. The loading of the torsion spring 53 after the tongue is bottomed in the slot of the fifth wheel will provide a driving force to the plate 22 to tightly snug the tongue in the fifth wheel slot. The crank 52 or the driving motor 59 will lock the torsion spring 53 in its wound up condition.

When the plate 22 is retracted to uncouple the tongue 61 from the fifth wheel 14, the tongue will be withdrawn under the trailer to rest on the slide plate 62. However, when the plate 22 is winched forwardly to project the tongue into the slot of the fifth wheel, the tongue is free to swing laterally with the fifth wheel as illustrated in FIG. 5. The swinging of the tongue 61 with the fifth wheel swings the arm 27 in the direction of the turning of the tractor 11 relative to the trailer 15 as when rounding a corner as shown in FIGS. 2 and 3 whereupon the link arm 27 rotates the pin 25 to drive the flexible shaft drive 36 thereby swinging the arm 39 and actuating the power steering valve 50.

As illustrated in FIGS. 4 and 5, hydraulic fluid from a pressure source such as a pump 65 mounted on the trailer 15 feeds the valve 50 which in turn supplies the fluid to opposite ends of a hydraulic ram 66 driving its piston 67 in opposite directions as controlled by the valve to actuate a steering linkage 68 for the rear wheels 16 of the trailer. Conventional steering linkages such as used for the tractor 11 can be provided for steering the rear wheels 16.

When the trailer is driven in a straight-forward direction, the wheels 16 will be locked in their straight-ahead position since the valve 50 will trap the fluid on opposite sides of the piston 67. The piston thus acts as a lock to hold the wheels in their straight-ahead position. However, when the valve 50 is driven by its link arm 39 from the flexible drive shaft 36, the fluid will be admitted into and withdrawn from the opposite sides of the piston in the hydraulic ram 66 so that the wheels 16 turn with the tractor as controlled by the swinging of the tractor fifth wheel. The fifth wheel in turn, swings the tongue 61 and the connecting link arm 27 to drive the flexible shaft and swing the valve arm 39. The slot connection between the valve arm 49 and the link arm 39 provides for controlled input to the valve 50 to moderate the degree of turning of the trailer wheels for accommodating tractors of different lengths to prevent extended swing-out of very long tractors. The input can be selectively controlled by varying the straight-ahead initial position of the roller 48 in the slot 47.

Instead of providing a flexible shaft drive between the link arm 27 and the valve control arm 49, the rotating flexible shaft drive 36 can be replaced with a push-pull Bowden wire drive as shown in FIG. 11 where parts identical with parts described herein above are marked with the same reference numerals.

As shown in FIG. 11, a bracket 70 is mounted on the arm 27 forwardly of its pivot pin 29. This bracket 70 has a portion 71 anchoring one end of the wire 72 of a Bowden wire connection 73. Another portion 74 of the bracket 70 anchors one end of the flexible tubular cable 75 surrounding the wire 72. The opposite end of the flexible tube 75 is anchored to a bracket 76 fixed on the trailer 15 adjacent the swinging arm 39. The opposite end of the wire 72 is anchored at 77 to this arm 39. Therefore, as the link 27 swings laterally, the wire 71 will be pushed and pulled through its flexible tube 75 to swing the arm 39 about its pivot 45 and thereby open and close the valve 50 as described hereinabove.

As illustrated in FIG. 12, the trailer has an audible alarm 80 and a light indicator assembly 81 mounted on its front end 15a. An electrical circuit is provided to sound the alarm 80 when the tractor turns at an acute angle relative to the trailer thereby warning the driver against an undesired over steering of the tractor wheels 16.

A green light 82 on the light indicator panel 81 can indicate the coupling of the tongue 61 to the fifth wheel 14 for automatic trailer wheel steering. An amber light 83 on the panel 81, for example, can indicate that the power is turned on for supplying the hydraulic fluid to the power ram for steering the tractor wheels and a red light 84 can indicate the locking of the tractor wheels in the straight-ahead position even when the tongue and fifth wheel are coupled. For this purpose a switch panel 85 is mounted adjacent the winch drive 51 to actuate a valve lock 66a for the hydraulic ram 66 so that the piston 67 will be held in locked position. It will, of course, be understood that all of the hydraulic controls and power source are mounted on the trailer and that the only power connection to the tractor is through the conventional electrical coupling provided for lights and brakes.

From the above descriptions, it will be well understood to those skilled in the art that this invention provides a self-contained power steering system for trailer wheels actuated through the conventional fifth wheel of a tractor and requiring no additional connection between the tractor and trailer.

Although the invention has been described with respect to preferred embodiments, it is not to be so limited, as changes and modifications can be made which are within the full intended scope of the invention as defined by the appended claims.

I claim as my invention:

1. A power steering system for trailers of the type having steerable rear trailer wheels and a front coupling pin for coupling to and uncoupling from a tractor having a slotted fifth wheel with a slot receiving the coupling pin of the trailer which comprises, a slide mounted under the trailer for fore and aft movement, a link having a rear end pivotally mounted on said slide and a front end swingable laterally about the pivoted rear end, a tongue pivoted on the front end of the link shaped to fit the slot of the tractor fifth wheel, means driving the slide to move the tongue into and out of said slot of the fifth wheel, said tongue when seated in said slot of the fifth wheel swinging said link laterally as the tractor turns relative to the trailer, a power steering assembly on said trailer for said steerable rear trailer wheels, a power steering valve controlling said power steering assembly, and means connecting said link with said power steering valve to effect steering of said steerable rear trailer wheels with the tractor as the tractor is turned relative to the trailer.

2. In a tractor-semi trailer vehicle of the type having a tractor with a slotted fifth wheel, a trailer with steerable rear wheels and a trailer kingpin selectively coupled to said slotted fifth wheel of the tractor, the improvement of a tongue mounted on the trailer fitting the slot of the fifth wheel to rotate with the fifth wheel about the trailer kingpin, means on the trailer advancing the tongue into the fifth wheel slot and retracting the tongue out of the slot and under the trailer, a power steering system for said steerable rear wheels of the trailer including a pressured hydraulic liquid source and a valve controlling the hydraulic liquid to power the steering of said steerable rear wheels, and means actuated by said tongue operating said valve, said power steering system capable of being selectively coupled and uncoupled by said advancing and retracting of said tongue while said tractor remains in coupling engagement with said trailer.

3. A tractor fifth wheel actuated trailer steering system which comprises in combination with a tractor having a fifth wheel and a trailer having steerable wheels, a slide mounted for fore and aft movement under the trailer, a forwardly projecting link swingably mounted on said slide and having a front end, a tongue pivotally mounted on the front end of said link arranged to be selectively coupled with the tractor fifth wheel to swing the link laterally as the fifth wheel turns, a power steering system including a power steering valve on the trailer for turning the steerable wheels of the trailer, and a flexible drive coupling connecting said link and said valve to operate the power steering system for turning the steerable trailer wheels with the turning of the tractor fifth wheel.

4. A trailer mounted power steering system for a trailer having steerable rear wheels and a tractor having steering wheels and a slotted fifth wheel for coupling from and uncoupling to the trailer which comprises a mechanism slidably mounted under the trailer for selective uncoupling from and coupling to the fifth wheel of the tractor, and a power steering system on the trailer controlled by said mechanism for steering the steerable rear wheels of the trailer simultaneously with the steering of the tractor steering wheels, said power steering system capable of being selectively coupled and uncoupled by advancing and retracting said mechanism while said tractor remains in coupling engagement with said trailer.

5. In a power steering system for a semi trailer having steerable rear wheels and a tractor having a fifth wheel for coupling to and uncoupling from the trailer, the improvement of a mechanism carried under the trailer adapted to be extended from uncoupled into coupled engagement with the tractor fifth wheel, and means actuated by said mechanism controlling the power steering system for turning the steerable rear wheels of the trailer as the tractor is turned, said power steering system capable of being selectively coupled and uncoupled by advancing and retracting said mechanism while said tractor remains in coupling engagement with said trailer.

6. The power steering system of claim 1, wherein the means driving the slide is a winch mechanism mounted along the side of the trailer.

7. The power steering system of claim 1, including magnets mounted on the tongue for gripping the fifth wheel.

8. The power steering system of claim 1, wherein the means connecting the link with the power steering valve is a flexible drive shaft.

9. The power steering system of claim 1, including a lost motion connection between the means connecting the link with the power steering valve and the valve.

10. In the tractor semitrailer vehicle of claim 2, the added improvement of spring means urging the tongue into tight contact with the slot of the fifth wheel.

11. In the tractor semitrailer vehicle of claim 10, the further added improvement of magnets carried by the tongue for gripping the slot of the fifth wheel.

12. In the tractor semitrailer vehicle of claim 2, the added improvement of flexible cable means driven by the tongue for actuating said valve.

13. The steering system of claim 3 including a flexible cable connection between said link and said control valve for transmitting swinging movement of the link into rotation of the valve.

14. The system of claim 3 including a torsion spring urging the slide forward to hold the tongue in coupled engagement with the fifth wheel.

15. The system of claim 3 including a winch mechanism mounted along a side of the trailer for driving the slide forward and rearward.

16. The system of claim 4, wherein said mechanism includes a member fitting the slot of the tractor fifth wheel to swing laterally as the fifth wheel is turned with the tractor.

17. The system of claim 4, wherein the mechanism includes means for snugly fitting the slot of the fifth wheel.

18. The system of claim 17, wherein said means for snugly fitting includes magnets.

19. The further improvement of claim 5, which comprises a slide powered from the trailer mounting said mechanism.

20. The further improvement of claim 5, which comprises indicators showing operation of the mechanism.

* * * * *